(12) United States Patent
Ma et al.

(10) Patent No.: US 9,355,637 B2
(45) Date of Patent: May 31, 2016

(54) METHOD AND APPARATUS FOR PERFORMING SPEECH KEYWORD RETRIEVAL

(71) Applicant: Tencent Technology (Shenzhen) Company Limited, Shenzhen (CN)

(72) Inventors: Jianxiong Ma, Shenzhen (CN); Lu Li, Shenzhen (CN); Li Lu, Shenzhen (CN); Xiang Zhang, Shenzhen (CN); Shuai Yue, Shenzhen (CN); Feng Rao, Shenzhen (CN); Eryu Wang, Shenzhen (CN); Linghui Kong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/620,000

(22) Filed: Feb. 11, 2015

(65) Prior Publication Data
US 2015/0154955 A1    Jun. 4, 2015

Related U.S. Application Data

(63) Continuation of application No. PCT/CN2014/083531, filed on Aug. 1, 2014.

(30) Foreign Application Priority Data

Aug. 19, 2013 (CN) .......................... 2013 1 0361835

(51) Int. Cl.
*G10L 15/18* (2013.01)
*G10L 15/28* (2013.01)
(Continued)

(52) U.S. Cl.
CPC ................. *G10L 15/18* (2013.01); *G10L 15/08* (2013.01); *G10L 15/28* (2013.01); *G10L 15/32* (2013.01); *G10L 2015/088* (2013.01)

(58) Field of Classification Search
CPC ......... G10L 15/00; G10L 15/02; G10L 15/08; G10L 2015/081; G10L 15/083; G10L 2015/088; G10L 15/18; G10L 15/22; G10L 15/28; G10L 15/32
See application file for complete search history.

(56) References Cited

U.S. PATENT DOCUMENTS 2,003,220 A    10/1931 Pearson
5,428,707 A *  6/1995 Gould et al. ................... 704/231
(Continued)

FOREIGN PATENT DOCUMENTS

CN    101030369 A    9/2007
CN    101231660 A    7/2008
(Continued)

OTHER PUBLICATIONS

Chinese Office Action to Chinese Application No. 201310361835.5, dated Jul. 13, 2015 and concise explanation in English, (9p).

*Primary Examiner* — Eric Yen
(74) *Attorney, Agent, or Firm* — Brinks Gilson & Lione

(57) ABSTRACT

A method and an apparatus are provided for retrieving keyword. The apparatus configures at least two types of language models in a model file, where each type of language model includes a recognition model and a corresponding decoding model; the apparatus extracts a speech feature from the to-be-processed speech data; performs language matching on the extracted speech feature by using recognition models in the model file one by one, and determines a recognition model based on a language matching rate; and determines a decoding model corresponding to the recognition model; decoding the extracted speech feature by using the determined decoding model, and obtains a word recognition result after the decoding; and matches a keyword in a keyword dictionary and the word recognition result, and outputs a matched keyword.

15 Claims, 4 Drawing Sheets

(51) Int. Cl.
*G10L 15/08* (2006.01)
*G10L 15/32* (2013.01)

(56) References Cited

U.S. PATENT DOCUMENTS

| | | | |
|---|---|---|---|
| 5,502,790 A * | 3/1996 | Yi | 704/256 |
| 5,689,616 A | 11/1997 | Li | |
| 5,805,771 A | 9/1998 | Muthusamy et al. | |
| 5,953,700 A * | 9/1999 | Kanevsky et al. | 704/270.1 |
| 6,029,124 A * | 2/2000 | Gillick et al. | 704/200 |
| 2002/0049590 A1* | 4/2002 | Yoshino et al. | 704/241 |
| 2002/0152069 A1* | 10/2002 | Gao et al. | 704/240 |
| 2004/0138893 A1* | 7/2004 | Mochary et al. | 704/277 |
| 2004/0204937 A1* | 10/2004 | Zhang et al. | 704/233 |
| 2005/0080623 A1* | 4/2005 | Furui et al. | 704/233 |
| 2005/0165598 A1* | 7/2005 | Cote et al. | 704/1 |
| 2007/0067159 A1* | 3/2007 | Basu et al. | 704/200 |
| 2010/0010813 A1* | 1/2010 | Harada | 704/249 |
| 2010/0076761 A1* | 3/2010 | Juergen et al. | 704/235 |
| 2010/0246966 A1* | 9/2010 | Fujimura | 382/190 |
| 2010/0268534 A1* | 10/2010 | Kishan Thambiratnam et al. | 704/235 |
| 2011/0301953 A1* | 12/2011 | Lee | 704/243 |
| 2012/0053935 A1* | 3/2012 | Malegaonkar et al. | 704/235 |

FOREIGN PATENT DOCUMENTS

| | | |
|---|---|---|
| CN | 101645269 A | 2/2010 |
| CN | 102521221 A | 6/2012 |

* cited by examiner

METHOD AND APPARATUS FOR PERFORMING SPEECH KEYWORD RETRIEVAL

CROSS-REFERENCE TO RELATED APPLICATIONS

This application is a continuation of International Application No. PCT/CN2014/083531, filed on Aug. 1, 2014, which claims priority to Chinese Patent Application No. 201310361835.5, filed on Aug. 19, 2013, both of which are hereby incorporated by reference in their entireties.

FIELD

The present disclosure relates to information processing technologies, and in particular, to a method and an apparatus for performing speech keyword retrieval.

BACKGROUND

In speech recognition technologies, a section of speech generally needs to be retrieved, so as to determine whether the speech includes a concerned keyword. For example, when speech recording is performed on a conference, whether the conference is a computer related conference needs to be determined, and the determining is performed by retrieving whether the recorded speech includes keywords such as "display," and "keyboard."

Applications of speech keyword retrieval are wider and wider currently, but a majority of the applications are performed for mandarin or another specific dialect, and therefore the limitation is large. In the conventional speech keyword retrieval solution, keyword retrieval is performed only for a certain type of languages, a retrieval algorithm for the language and a language model are fused together, the retrieval algorithm is responsible for the entire retrieval process, where the language model is invoked to perform language recognition and decoding, and after the decoding, whether a concerned keyword exists in a decoding result is judged; if yes, the corresponding keyword is output; if speech data does not belong to the language, recognition cannot be performed, and another retrieval algorithm capable of recognizing the corresponding language needs to be used to perform keyword retrieval on the language again.

To sum up, in the conventional technology, the speech keyword retrieval solution only supports processing for a certain specific language, and each type of languages have respective complete speech keyword retrieval solutions, the limitation is very large, and the cost is high.

SUMMARY

The present disclosure provides a method and an apparatus for performing speech keyword retrieval, and the method can support keyword retrieval of at least two languages, so as to save the cost.

The present disclosure provides a method and an apparatus for performing speech keyword retrieval, and the apparatus can support keyword retrieval of at least two languages, so as to save the cost.

In one aspect, a method is implemented in a computing apparatus for performing speech keyword retrieval. In the method, the apparatus configures at least two types of language models in a model file, and each type of language model includes a recognition model and a corresponding decoding model. The apparatus extracts a speech feature from the to-be-processed speech data; performs language matching on the extracted speech feature by using recognition models in the model file one by one, and determines a recognition model with the highest language matching rate; and determines a decoding model corresponding to the recognition model with the highest language matching rate from the language models in the model file; decodes the extracted speech feature by using the determined decoding model, and obtains a word recognition result after the decoding; and matches a keyword in a keyword dictionary and the word recognition result, and outputs a successfully matched keyword.

In a second aspect, an apparatus is provided for performing speech keyword retrieval is provided. The apparatus includes a processor and a non-transitory memory storage medium configured to store units. The stored units includes: a model file configuring unit, a feature extracting unit, a language recognition unit, a decoding unit and a keyword search unit. The model file configuring unit configures at least two types of language models in a model file, and each type of language model includes a recognition model and a corresponding decoding model. The feature extracting unit receives to-be-processed speech data, extracts a speech feature from the to-be-processed speech data, and sends the extracted speech feature to the language recognition unit. The language recognition unit performs language matching on the extracted speech feature by using recognition models in the model file one by one, and determines a recognition model with the highest language matching rate; and determines a decoding model corresponding to the recognition model with the highest language matching rate from the language models, and sends the extracted speech feature to the decoding unit. The decoding unit decodes the extracted speech feature by using the determined decoding model, obtains a word recognition result after the decoding, and sends the word recognition result to the keyword search unit. The keyword search unit matches a keyword in a keyword dictionary and the word recognition result, and outputs a successfully matched keyword.

In another aspect, the apparatus is configured to perform acts using the processor. The acts includes: configuring at least two types of language models in a model file, and each type of language model comprises a recognition model and a corresponding decoding model; extracting a speech feature from to-be-processed speech data, and sending the extracted speech feature; performing language matching on the extracted speech feature by using recognition models in the model file one by one, determining a recognition model based on a language matching rate; determining a decoding model corresponding to the recognition model with the highest language matching rate from the language models, and sending the extracted speech feature; decoding the extracted speech feature by using the determined decoding model, obtaining a word recognition result after the decoding, and sending the word recognition result; and matching a keyword in a keyword dictionary and the word recognition result, and outputting a matched keyword

BRIEF DESCRIPTION OF THE DRAWINGS

The disclosure will become more fully understood from the detailed description given herein below for illustration only, and thus are not limitative of the disclosure, and wherein.

DETAILED DESCRIPTION OF THE DRAWINGS

Figure 1:
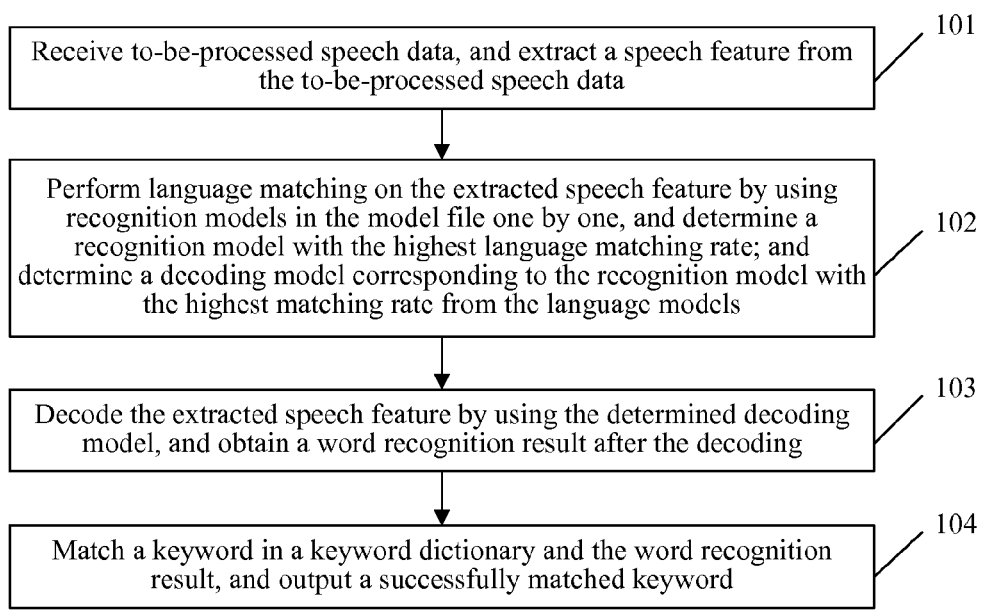
FIG. 1 is a schematic flowchart of a method for performing speech keyword retrieval according to the present disclosure.

Reference throughout this specification to "embodiments," "an embodiment," "example embodiment," or the like in the singular or plural means that one or more particular features, structures, or characteristics described in connection with an embodiment is included in at least embodiments of the present disclosure. Thus, the appearances of the phrases "in embodiments" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

The solutions in the embodiments of the present disclosure are clearly and completely described in combination with the attached drawings in the embodiments of the present disclosure. Obviously, the described embodiments are only a part, but not all, of the embodiments of the present disclosure. On the basis of the embodiments of the present disclosure, all other embodiments acquired by those of ordinary skill in the art under the precondition that no creative efforts have been made shall be covered by the protective scope of the present disclosure.

In order to make the objectives, technical solutions, and advantages of the present disclosure more comprehensible, the present disclosure is further described in detail below with reference to embodiments and the accompanying drawings.

In the present disclosure, a model file is set, at least two types of language models are configured in the model file, and speech keyword retrieval is performed based on the model file, so as to perform processing on more than two types of languages in a retrieval solution.

FIG. 1 is a schematic flowchart of a method for performing speech keyword retrieval according to the present disclosure. In the method, a model file is preset, at least two types of language models are configured in the model file, and each type of language model includes a recognition model and a corresponding decoding model; each recognition model recognizes a speech in a language with a certain feature, and after the language is determined to be a language supported by this recognition model, the feature is sent to the decoding model corresponding to this recognition model and decoded.

The method in FIG. 1 includes the following steps. The method may be implemented in a device including a processor. For example, the method may be implemented at least partially by a server or a user terminal.

Step 101: The device receives to-be-processed speech data, and extracts a speech feature from the to-be-processed speech data.

During implementation, this step may include: performing speech waveform processing on the to-be-processed speech data, and extracting a speech feature sequence changing over time from a speech waveform, where the extracted speech feature has distinguishability.

Step 102: The device performs language matching on the extracted speech feature by using recognition models in the model file one by one, and determines a recognition model with the highest language matching rate; and determines a decoding model corresponding to the recognition model with the highest language matching rate from the language models in the model file. For example, the device may select one of the language models as the decoding model, where the selected language model corresponds to the recognition model with the highest language matching rate.

The recognition model is used for recognizing a language of the speech, so as to determine whether the language is a language which this recognition model can recognize.

Step 103: The device decodes the extracted speech feature by using the determined decoding model, and obtains a word recognition result after the decoding.

During implementation, this step may include: searching a search network for an optimal matching path for each frame of the extracted speech feature by using the determined decoding model, obtaining a most possible recognition result as the recognition result after the decoding, where at least one recognition result exists.

The search network is specifically a weighted finite state transducer (WFST, Weighted Finite State Transducer) search network, and the WFST search network is a search network synthesizing an acoustic model, a language model and a word table. The decoding model performs decoding calculation according to the WFST search network, and finally outputs a word net tailored to some extent, the word net possesses a start node, an end node, and an intermediate node between the start node and the end node, each node represents a possible word in a certain period of time, at least one path exists between the start node and the end node, and each path represents a recognition result.

For example, in a certain example, two paths exist between the start node and the end node, where one path has five nodes, and words corresponding to a node sequence from the start node to the end node are 'wǒ', 'mén', 'chī', 'fàn', and 'ba', that is, the recognition result is "wǒ mén chī fàn ba"; the other path also has five nodes, and words corresponding to a node sequence from the start node to the end node are 'wǒ', 'mén', 'chí', 'fàn', 'ba', that is, the other recognition result is "wǒ mén chí fàn ba".

Step 104: The device matches a keyword in a keyword dictionary and the word recognition result, and outputs a successfully matched keyword.

If the word recognition result obtained in step 103 is an optimal matching path found in the search network, correspondingly, this step specifically includes:

performing a minimum error alignment operation on the word net of the optimal matching path, and generating a confusion network, where the confusion network performs sequencing according to time, and gives a word recognition result of each period of time and a probability of the word recognition result; and matching a keyword in the keyword dictionary and each word recognition result in the confusion network, and determining a successfully matched word recognition result as a successfully matched keyword.

The minimum error alignment operation is the conventional technology, and the technology can analyze the word net of the optimal matching path, determine multiple recognition results possibly corresponding to a certain period of time, and give a probability of each word recognition result. Description is made still with the foregoing example of "wǒ mén chī fàn ba" and "wǒ mén chí fàn ba", and after the minimum error alignment operation is used, it is determined that recognition results corresponding to the first node and the second node are 'wǒ', and 'mén'; recognition results corresponding to the third node are 'chī' and 'chí', and probabilities of 'chī' and 'chí' are given; recognition results corresponding to the fourth node and the fifth node are 'fàn' and 'ba'. If only one path exists between the start node and the end node, the minimum error alignment operation does not need to be used to perform analyzing processing.

The keyword dictionary includes concerned keywords, and all the keywords in the keyword dictionary are each matched with each word recognition result, and if they are the same, the keywords are determined as successfully matched word recognition results. If the keyword dictionary includes "chī fàn", "shū cài", "sù shí", for the foregoing example, a keyword output after the matching is "chī fàn".

In the present disclosure, at least two types of language models are configured in a model file, and each type of language model includes a recognition model and a corresponding decoding model; when keyword retrieval needs to be performed, a speech feature is extracted from to-be-processed speech data; language matching is performed on the extracted speech feature by using recognition models in the model file one by one, and a recognition model with the highest language matching rate is determined; and a decoding model corresponding to the recognition model with the highest language matching rate is determined from the language models in the model file, decoding is performed and then a word recognition result after the decoding is obtained; a keyword in a keyword dictionary and the word recognition result are matched, and a successfully matched keyword is output. By using the solution of the present disclosure, according to actual needs, at least two types of language models may be configured in a model file, and keyword retrieval is performed on more than two types of languages, thereby solving the defect that the conventional technology only supports processing for a certain specific language, and saving the cost.

In the conventional speech keyword retrieval solution, keyword retrieval is performed only for a certain type of languages, and during specific implementation, the retrieval algorithm for the language and the language model are fused together, but such processing is lack of extensibility, namely, when there is a demand for another dialect, dynamic support cannot be performed. After the solution of the present disclosure is used, when language extension needs to be performed, a recognition model and a decoding model for the language are trained and created; a language model is added into the model file, where the added language model includes the created recognition model and the corresponding decoding model. Therefore, keyword retrieval may be performed in combination with the newly added language model subsequently.

Figure 2:
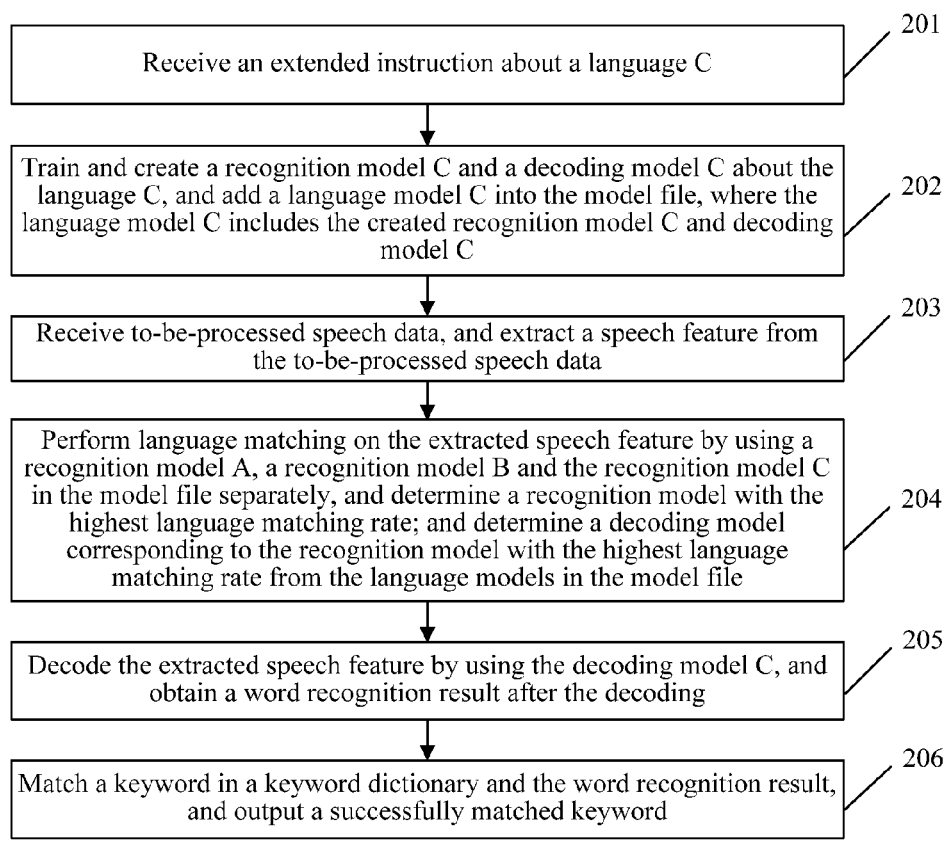
FIG. 2 shows an example of the flowchart of the method for performing speech keyword retrieval according to the present disclosure.

A method for performing speech keyword retrieval according to the present disclosure is exemplified below by using the method in FIG. 2. The method may be implemented by a computing system includes at least a server and a user terminal Two types of language models about a language A and a language B are configured in a model file, each type of language model includes a recognition model and a corresponding decoding model, and the method includes the following steps.

Step 201: receive an extended instruction about a language C.

Step 202: train and create a recognition model C and a decoding model C about the language C, and add a language model C into the model file, where the language model C includes the created recognition model C and decoding model C.

Training of a recognition model and a decoding model about a certain language may be implemented by using the conventional solution, which is not detailed herein.

Step 203: receive to-be-processed speech data, and extract a speech feature from the to-be-processed speech data.

The objective of the process is to extract a speech feature sequence changing over time from a speech waveform, and the extracted feature parameter can effectively represent the speech feature, has very good distinguishability, and is used as basic data of subsequent processing.

Step 204: perform language matching on the extracted speech feature by using a recognition model A, a recognition model B and the recognition model C in the model file separately, and determine a recognition model with the highest language matching rate; and determine a decoding model corresponding to the recognition model with the highest language matching rate from the language models in the model file.

In this example, it is assumed that the recognition model C has the highest matching rate, and is corresponding to the decoding model C. Identifying of a recognition model for a speech feature may be implemented by using the conventional solution.

Step 205: decode the extracted speech feature by using the decoding model C, and obtain a word recognition result after the decoding.

A decoding model is a model used in a process of decoding a speech for a corresponding language; the decoding model is formed by combining an acoustic model, a language model and a word table, the extracted speech feature may be parsed, a word net tailored to some extent is generated, and a subsequent algorithm performs calculation in this search network to obtain a final keyword result. Decoding of the decoding model for the speech feature may be implemented by using the conventional solution.

Step 206: match a keyword in a keyword dictionary and the word recognition result, and output a successfully matched keyword.

In this example, the algorithm and the model for keyword retrieval are separated, so that dynamic extended dialect support becomes possible. When a new dialect needs to be supported, keyword retrieval for the new dialect can be supported as long as a new model for the new dialect is trained and configured. Compared with the conventional solution of fusing a retrieval algorithm and a language model to a high extent, this example is maximally characterized by extensibility, may flexibly add or cancel support for a specific language according to an actual demand, and also reduces the cost of continuous upgrading due to a demand Additionally, this example also has a certain advantage in maintainability, and the retrieval algorithm and the language model are separated so that the two parts are explicit in function, the structure is clearer, and the deployment is relatively simpler.

Figure 3:
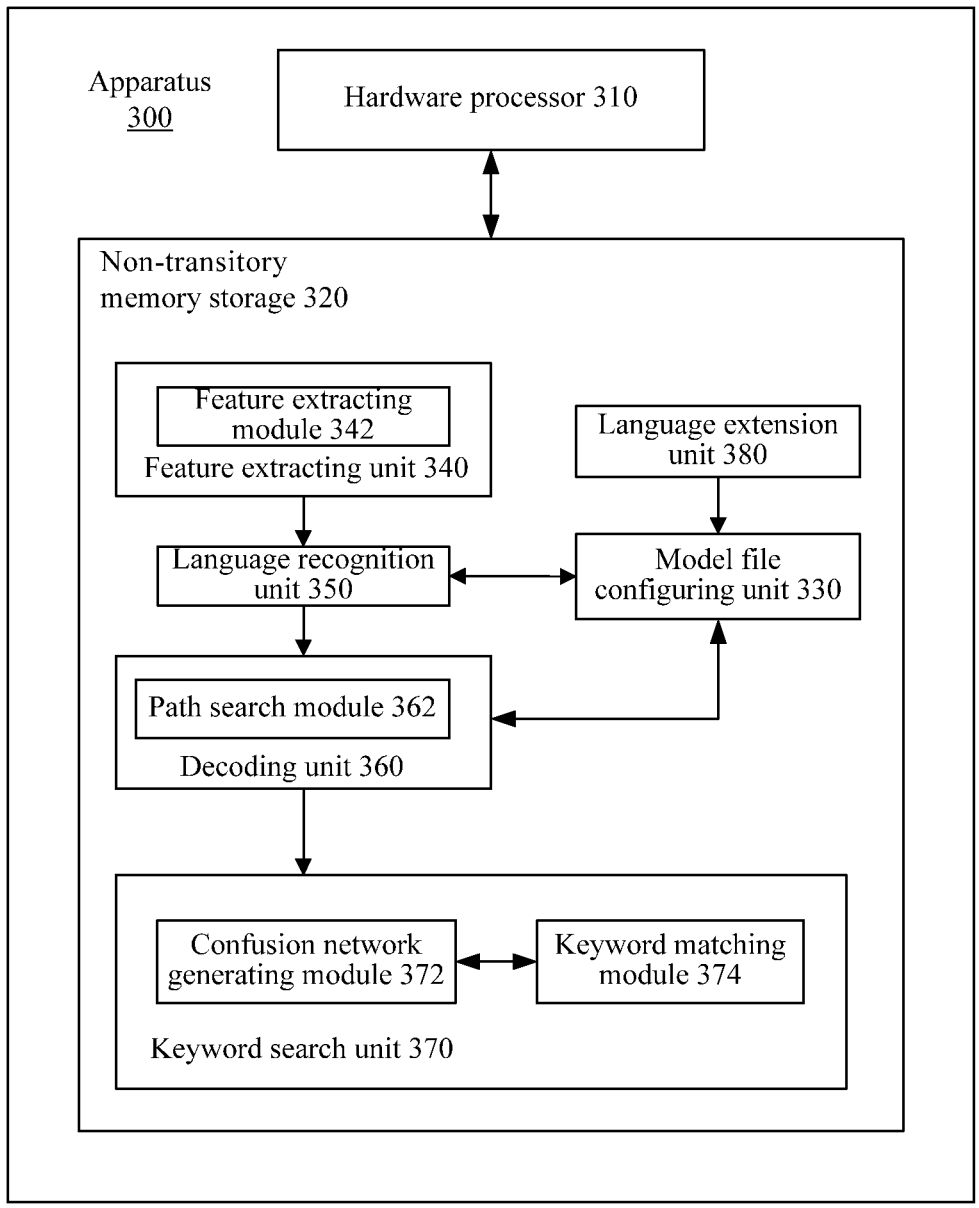
FIG. 3 is a schematic structural diagram of an apparatus for performing speech keyword retrieval according to the present disclosure.

FIG. 3 is a schematic structural diagram of an apparatus 300 for performing speech keyword retrieval according to the present disclosure. The apparatus 300 may include a server or a user terminal device. The apparatus 300 includes a hardware processor 310 and a non-transitory memory storage medium 320 accessible to the hardware processor 310. The non-transitory memory storage medium 320 stores modules and units that include a model file configuring unit 330, a feature extracting unit 340, a language recognition unit 350, a decoding unit 360 and a keyword search unit 370. The non-transitory memory storage medium 320 may store additional units or modules.

The model file configuring unit 330 configures at least two types of language models in a model file, and each type of language model includes a recognition model and a corresponding decoding model;

the feature extracting unit 340 receives to-be-processed speech data, extracts a speech feature from the to-be-processed speech data, and sends the extracted speech feature to the language recognition unit;

the language recognition unit 350 performs language matching on the extracted speech feature by using recognition models in the model file one by one, and determines a recognition model with the highest language matching rate; and determines a decoding model corresponding to the recognition model with the highest language matching rate from the language models in the model file, and sends the extracted speech feature to the decoding unit;

the decoding unit 360 decodes the extracted speech feature by using the determined decoding model, obtains a word recognition result after the decoding, and sends the word recognition result to the keyword search unit; and the keyword search unit 370 matches a keyword in a keyword dictionary and the word recognition result, and outputs a successfully matched keyword.

Preferably, the apparatus 300 further includes a language extension unit 380, which trains and creates a new recognition model and a new decoding model, and adds a language model into a model file, where the language model includes the created recognition model and the corresponding decoding model.

Preferably, the feature extracting unit 340 includes a feature extracting module 342, which performs speech waveform processing on the to-be-processed speech data, and extracts a speech feature sequence changing over time from a speech waveform, where the extracted speech feature has distinguishability.

Preferably, the decoding unit 360 includes a path search module 362, which searches a search network for an optimal matching path for each frame of the extracted speech feature by using the determined decoding model, and obtains a word net as the word recognition result after the decoding, where the word net includes a start node, an end node, and an intermediate node between the start node and the end node, and each node represents a word corresponding to a period of time.

Preferably, the keyword search unit 370 includes a confusion network generating module 372 and a keyword matching module 374;

the confusion network generating module performs a minimum error alignment operation on the word net of the optimal matching path, and generates a confusion network, where the confusion network performs sequencing according to time, and gives a word recognition result of each period of time and a probability of the word recognition result; and the keyword matching module matches a keyword in the keyword dictionary and each word recognition result in the confusion network, and determines a successfully matched word recognition result as a successfully matched keyword.

Figure 4:
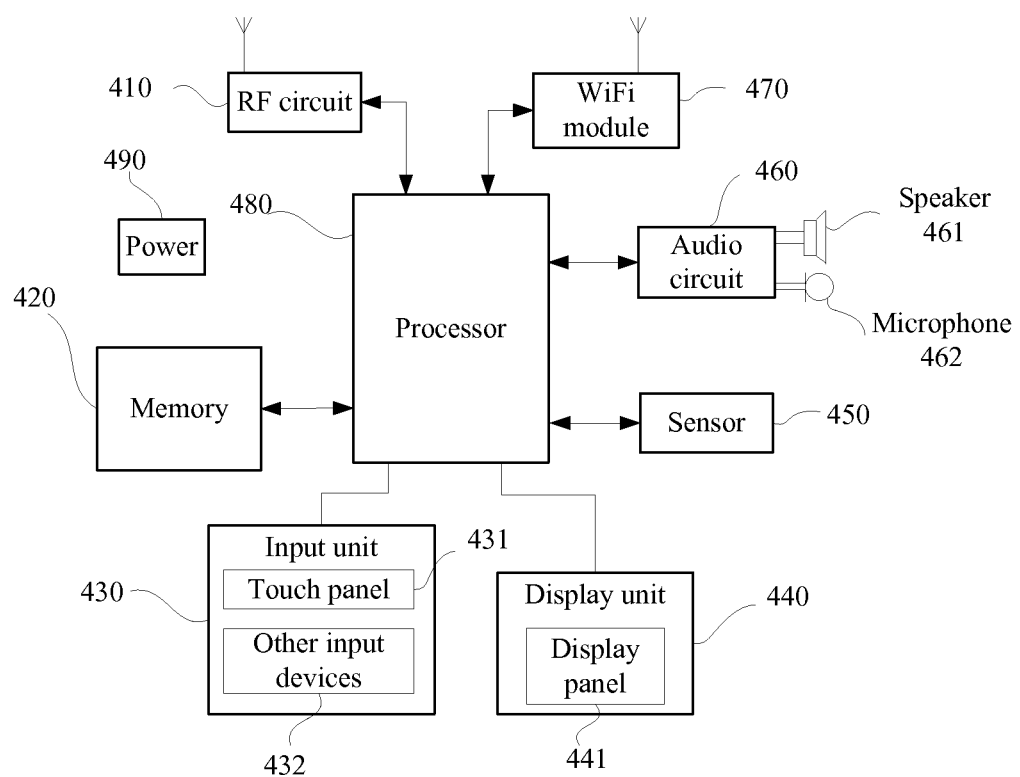
FIG. 4 is a block diagram of an apparatus according to embodiments of the present disclosure.

FIG. 4 shows a block diagram of an apparatus 400 according to embodiments of the present disclosure. For example, the apparatus may be any terminal device such as a mobile phone, a Tablet PC, a PDA (Personal Digital Assistant), a POS (Point of Sales), a car PC, or any computing device having a processor.

For example, the apparatus 400 may be a mobile phone that includes a radio frequency (RF) circuit 410, a memory 420, an input unit 430, a display unit 440, a sensor 450, an audio circuit 460, a WiFi module 470, a processor 480, and a power 490, etc. It's understood for persons skilled in the art that, the structure of a mobile phone illustrated in FIG. 4 is not limited, some components can be added or omitted, or some combinations or arrangement can be included.

Following is a detailed description of the structure of the mobile phone by combining with FIG. 4.

The RF circuit 410 is configured to receive and sending signals during calling or process of receiving and sending message. Specially, the RF circuit 410 will receive downlink information from the base station and send it to the processor 480; or send uplink data to the base station. Generally, the RF circuit 410 includes, but is not limited to, an antenna, at least one amplifier, a transceiver, a coupler, a low noise amplifier (LNA), a diplexer, and the like. In addition, the RF circuit 40 can communicate with network or other devices by wireless communication. Such wireless communication can use any one communication standard or protocol, which includes, but is not limited to, Global System of Mobile communication (GSM), (General Packet Radio Service, GPRS), (Code Division Multiple Access, CDMA), (Wideband Code Division Multiple Access, WCDMA), (Long Term Evolution, LTE), email, or (Short Messaging Service, SMS).

The memory 420 is configured to store software program and module which will be run by the processor 480, so as to perform multiple functional applications of the mobile phone and data processing. The memory 420 mainly includes storing program area and storing data area. Concretely, the storing program area can store the operating system, at least one application program with required function (such as sound playing function, image playing function, etc.). The storing data area can store data established by mobile phone according to actual using demand (such as audio data, phonebook, etc.) Furthermore, the memory 420 can be high-speed random access memory, or nonvolatile memory, such as disk storage, flash memory device, or other volatile solid-state memory storage devices.

The input unit 430 is configured to receive the entered number or character information, and the entered key signal related to user setting and function control of the apparatus 400. Concretely, the input unit 430 includes a touch panel 431 or other input devices 432. The touch panel 431 is called as touch screen, which can collect user's touch operations thereon or nearby (for example the operations generated by fingers of user or stylus pen, and the like, touching on the touch panel 431 or touching near the touch panel 431), and drive the corresponding connection device according to the preset program. Optionally, the touch panel 431 includes two portions including a touch detection device and a touch controller. For example the touch detection device is configured to detect touch position of the user and detecting signals accordingly, and then sending the signals to the touch controller. Subsequently, the touch controller receives touch information from the touch detection device, and converts it to contact coordinates which are to be sent to the processor 480, and then receives command sent by the processor 480 to perform. In addition, besides the touch panel 431, the input unit 430 can include, but is not limited to, other input devices 432, such as one or more selected from physical keyboard, function keys (such as volume control keys, switch key-press, etc.), a trackball, a mouse, and an operating lever, etc.

The display unit 440 is configured to display information entered by the user or information supplied to the user, and menus of the mobile phone. For example, the display unit 440 includes a display panel 441, such as a Liquid Crystal Display (LCD), or an Organic Light-Emitting Diode (OLED). Furthermore, the display panel 441 can be covered by the touch panel 431, after touch operations are detected on or near the touch panel 431, they will be sent to the processor 480 to determine the type of the touching event. Subsequently, the processor 480 supplies the corresponding visual output to the display panel 441 according to the type of the touching event. As shown in FIG. 4, the touch panel 431 and the display panel 441 are two individual components to implement input and output of the mobile phone, but they can be integrated together to implement the input and output in some embodiments.

Furthermore, the apparatus 400 includes at least one sensor 450, such as light sensors, motion sensors, or other sensors. For example the light sensors includes ambient light sensors for adjusting brightness of the display panel 441 according to the ambient light, and proximity sensors for turning off the display panel 441 and/or maintaining backlight when the mobile phone is moved to the ear side. Accelerometer sensor as one of the motion sensors can detect the magnitude of accelerations in every direction (Triaxial, generally), and detect the magnitude and direction of gravity in an immobile status, which is applicable to applications of identifying attitudes of the mobile (such as switching between horizontal and vertical screens, related games, magnetometer attitude calibration, etc.), vibration recognition related functions (such as pedometer, percussion, etc.). And the apparatus 400 also can configure other sensors (such as gyroscopes, barometers, hygrometers, thermometers, infrared sensors, etc.) whose detailed descriptions are omitted here.

The audio circuit 460, the speaker 461 and the microphone 462 supply an audio interface between the user and the mobile phone. For example the audio data is received and converted to electrical signals by audio circuit 460, and then transmitted to the speaker 461, which are converted to sound signal to output. On the other hand, the sound signal collected by the speaker is then converted to electrical signals which will be received and converted to audio data. Subsequently, the audio data are output to the processor 480 to process, and then sent to another mobile phone via the RF circuit 410, or sent to the memory 420 to process further.

WiFi pertains to short-range wireless transmission technology providing a wireless broadband Internet, by which the mobile phone can help the user to receive and send email, browse web, and access streaming media, etc. Although the WiFi module 470 is illustrated in FIG. 4, it should be understood that, WiFi module 470 is not a necessary for the mobile phone, which can be omitted according the actual demand without changing the essence of the present disclosure.

The processor 480 is a control center of the computing apparatus, which connects with every part of the apparatus by various interfaces or circuits, and performs various functions and processes data by running or performing software program/module stored in the memory 420 or calling data stored in the memory 420, so as to monitor the mobile phone. Optionally, the processor 480 may include one or more processing units. Preferably, the processor 480 can integrate with application processors and modem processors, for example, the application processors include processing operating system, user interface and applications, etc.; the modern processors are used for performing wireless communication. It can be understood that, it's an option to integrate the modern processors to the processor 480.

In addition, the apparatus 400 may include a camera, and a Bluetooth module, etc., which are not illustrated.

Preferably, the apparatus 400 further includes a language extension unit, which trains and creates a new recognition model and a new decoding model, and adds a language model into a model file, where the language model includes the created recognition model and the corresponding decoding model.

Preferably, the feature extracting unit includes a feature extracting module, which performs speech waveform processing on the to-be-processed speech data, and extracts a speech feature sequence changing over time from a speech waveform, where the extracted speech feature has distinguishability.

Preferably, the decoding unit includes a path search module, which searches a search network for an optimal matching path for each frame of the speech feature, and obtains a word net as the word recognition result after the decoding, where the word net includes a start node, an end node, and an intermediate node between the start node and the end node, and each node represents a word corresponding to a period of time.

Preferably, the keyword search unit includes a confusion network generating module and a keyword matching module; the confusion network generating module performs a minimum error alignment operation on the word net of the optimal matching path, and generates a confusion network, where the confusion network performs sequencing according to time, and gives a word recognition result of each period of time and a probability of the word recognition result; and the keyword matching module matches a keyword in the keyword dictionary and each word recognition result in the confusion network, and determines a successfully matched word recognition result as a successfully matched keyword.

It can be seen from the foregoing solution that, in the present disclosure, at least two types of language models are configured in a model file, and each type of language model includes a recognition model and a corresponding decoding model; when keyword retrieval needs to be performed, a speech feature is extracted from to-be-processed speech data; language matching is performed on the extracted speech feature by using recognition models in the model file one by one, and a recognition model with the highest language matching rate is determined; and a decoding model corresponding to the recognition model with the highest language matching rate is determined from the language models in the model file, decoding is performed and then a word recognition result after the decoding is obtained; a keyword in a keyword dictionary and the word recognition result are matched, and a successfully matched keyword is output. By using the solution of the present disclosure, according to actual needs, at least two types of language models may be configured in a model file, and keyword retrieval is performed on more than two types of languages in a retrieval solution, thereby solving the defect that the conventional technology only supports processing for a certain specific language, and saving the cost.

The above descriptions are merely preferred embodiments of the present disclosure, but not intended to limit the scope of the present disclosure. Any modification, equivalent replacement, or improvement made without departing from the spirit and principle of the present disclosure should fall within the scope of the present disclosure.

What is claimed is:

1. A method for retrieving keyword from speech, comprising:
    configuring, by an apparatus comprising a processor circuitry, language models, wherein at least two of the language models each comprises a recognition model and a decoding model that corresponds to the recognition model;
    extracting a speech feature, by the apparatus, from to-be-processed speech data;
    determining, by the apparatus, which of the recognition models has a highest language matching rate by performing, using the recognition models, language matching on the extracted speech feature;
    identifying, by the apparatus, the decoding model which corresponds to the determined recognition model;
    decoding, by the apparatus, the extracted speech feature by using the identified decoding model, and obtaining a word recognition result; and
    matching, by the apparatus, a keyword in a keyword dictionary and the word recognition result with each other, and outputting a matched keyword on a display of the apparatus.

2. The method according to claim 1, further comprising:
    training and creating a new recognition model and a new decoding model, both the new recognition model and the new decoding model corresponding to a new dialect; and
    adding a new language model into a model file, wherein the new language model comprises the new recognition model and the new decoding model.

3. The method according to claim 1, wherein extracting the speech feature from the to-be-processed speech data comprises:
    performing speech waveform processing on the to-be-processed speech data, and obtaining a speech feature sequence by extracting the speech feature sequence from a speech waveform.

4. The method according to claim 1, wherein decoding the extracted speech feature by using the identified decoding model comprises:
    searching for an optimal matching path for the extracted speech feature by using the identified decoding model, and obtaining a word net as the word recognition result, wherein the word net comprises a start node, an end node, and an intermediate node between the start node and the end node, and each node represents a word corresponding to a period of time.

5. The method according to claim 4, wherein matching the keyword in the keyword dictionary and the word recognition result with each other comprises:
    performing a minimum error alignment operation on the word net, and generating a confusion network, wherein the confusion network performs sequencing according to time, and gives a word recognition result and a probability of the word recognition result during a period of time; and
    matching a keyword in the keyword dictionary and the word recognition result in the confusion network with each other, and determining a matched word recognition result as the matched keyword.

6. An apparatus for performing speech keyword retrieval, comprising a processor and a non-transitory storage medium accessible to the processor, the non-transitory storage medium configured to store units comprising:
    a file configuring unit that configures language models, and at least two of the language models each comprises a recognition model and a decoding model that corresponds to the recognition model;
    a feature extracting unit that extracts a speech feature from to-be-processed speech data, and sends the extracted speech feature to a language recognition unit;
    the language recognition unit that determines which of the recognition models has a highest language matching rate by performing, using the recognition models, language matching on the extracted speech feature; identifies the decoding model that corresponds to the determined recognition model, and sends the extracted speech feature to a decoding unit;
    the decoding unit that decodes the extracted speech feature by using the identified decoding model, obtains a word recognition result, and sends the word recognition result to a keyword search unit; and
    the keyword search unit that matches a keyword in a keyword dictionary and the word recognition result with each other, and outputs a matched keyword on a display of the apparatus.

7. The apparatus according to claim 6, further comprising a language extension unit that trains and creates a new recognition model and a new decoding model, and adds a language model into a model file, wherein the language model comprises the new recognition model and the new decoding model, wherein both the new recognition model and the new decoding model correspond to a new dialect.

8. The apparatus according to claim 6, wherein the feature extracting unit comprises a feature extracting module that performs speech waveform processing on the to-be-processed speech data, and obtains a speech feature sequence by extracting the speech feature sequence from a speech waveform.

9. The apparatus according to claim 6, wherein the decoding unit comprises a path search module that searches for an optimal matching path for the speech feature, and obtains a word net as the word recognition result, wherein the word net comprises a start node, an end node, and an intermediate node between the start node and the end node, and each node represents a word corresponding to a period of time.

10. The apparatus according to claim 9, wherein the keyword search unit comprises a confusion network generating module and a keyword matching module;

the confusion network generating module performs a minimum error alignment operation on the word net of the optimal matching path, and generates a confusion network, wherein the confusion network performs sequencing according to time, and gives a word recognition result and a probability of the word recognition result during a period of time; and the keyword matching module matches a keyword in the keyword dictionary and the word recognition result in the confusion network with each other, and determines a matched word recognition result as a matched keyword.

11. A phone for performing speech keyword retrieval, comprising a processor and a non-transitory storage medium accessible to the processor, the phone configured to perform acts comprising:

configuring language models, and at least two of the language models each comprises a recognition model and a decoding model that corresponds to the recognition model;

extracting a speech feature from to-be-processed speech data, and sending the extracted speech feature;

determining which of the recognition models has a highest language matching rate by performing, using the recognition models, language matching on the extracted speech feature; identifying the decoding model that corresponds to the determined recognition model, and sending the extracted speech feature;

decoding the extracted speech feature by using the identified decoding model, obtaining a word recognition result, and sending the word recognition result; and matching a keyword in a keyword dictionary and the word recognition result with each other, and outputting a matched keyword on a display of the phone.

12. The phone according to claim 11, the acts further comprising training and creating a new recognition model and a new decoding model, and adding a language model into a model file, wherein the language model comprises the new recognition model and the new decoding model, wherein both the new recognition model and the new decoding model correspond to a new dialect.

13. The phone according to claim 12, the acts further comprising performing speech waveform processing on the to-be-processed speech data, and obtaining a speech feature sequence by extracting the speech feature sequence from a speech waveform.

14. The phone according to claim 11, wherein decoding the extracted speech feature comprises:

searching for an optimal matching path for the speech feature, and obtaining a word net as the word recognition result, wherein the word net comprises a start node, an end node, and an intermediate node between the start node and the end node, and each node represents a word corresponding to a period of time.

15. The phone according to claim 14, wherein the acts further comprising:

performing a minimum error alignment operation on the word net of the optimal matching path, and generates a confusion network, wherein the confusion network performs sequencing according to time, and giving a word recognition result and a probability of the word recognition result during a period of time; and matching a keyword in the keyword dictionary and the word recognition result in the confusion network with each other, and determining a matched word recognition result as the matched keyword.

\* \* \* \* \*